United States Patent [19]

Sordello et al.

[11] Patent Number: 4,581,664
[45] Date of Patent: Apr. 8, 1986

[54] DISK ACCESSING CIRCUITRY

[75] Inventors: Frank J. Sordello, Los Gatos; Andrew M. Rose, Mt. View, both of Calif.

[73] Assignee: Memorex Corporation, Santa Clara, Calif.

[21] Appl. No.: 534,437

[22] Filed: Sep. 21, 1983

[51] Int. Cl.⁴ .............................................. G11B 5/55
[52] U.S. Cl. ...................................................... 360/78
[58] Field of Search .......................................... 360/78

[56] References Cited

U.S. PATENT DOCUMENTS 4,477,755 10/1984 Rickert ................................ 318/611

OTHER PUBLICATIONS

IBM Technical Disclosure Bulletin, vol. 22, No. 9, Feb. 1980, p. 4172 Seek Resonance Detuning, D. A. Brereton.

Primary Examiner—George G. Stellar
Attorney, Agent, or Firm—Nathan Cass; David W. Heid; Kevin R. Peterson

[57] ABSTRACT

A disk storage system is disclosed comprising a rotatable disk, a cooperating magnetic head, positioning apparatus for positioning the head at different radial positions of the disk for reading and/or writing data on the disk, a baseplate for supporting the above, and control circuitry for preventing oscillation build-up in the baseplate from deleteriously interfering with system performance. The control circuitry is constructed and arranged to control the timing of head positioning operations so as to inhibit the reinforcement of baseplate oscillations.

7 Claims, 7 Drawing Figures

DISK ACCESSING CIRCUITRY

BACKGROUND OF THE INVENTION

This invention relates generally to magnetic disk memory systems, and more particularly to improved means and methods for preventing mechanical disturbances, such as mechanical resonances, from deleteriously interfering with disk system performance.

Magnetic disk memory systems typically comprise one or more rotating disks and one or more magnetic heads which are moved radially relative to the disks in order to position the heads to read and/or write data in particular circular tracks provided on the disks. A significant problem occurring in such disk memory systems arises because, during magnetic head positioning operations (conventionally referred to as seek operations), positioning reaction forces act on the disk supporting structure, such as the baseplate of the disk system, which can cause the structure to resonate at a sufficiently high level so that the head-relative-to-disk disturbance which results cannot be adequately compensated for by the positioning servo control circuitry, thereby preventing reliable and accurate head positioning. The disturbing effect is sometimes called "baseplate pumping".

Various approaches have been employed in the prior art to attempt to solve this resonance problem. These approaches have involved, for example, increasing the gain and bandwidth of the positioning control servo to better compensate for the oscillation, altering the design of the mechanical structure to prevent a resonance condition from occurring, preventing the introduction of critical frequencies into the system, and comparing actual and synthesized motion to produce a correcting force which will inhibit resonance. Such approaches are disclosed in U.S. Pat. Nos. 3,126,535; 3,686,650; 3,906,326; 3,924,268; 3,947,881; 3,967,515; and 4,030,132.

BRIEF SUMMARY OF THE INVENTION

The above referred to prior art approaches for solving the described resonance problem are undesirable, since they add significantly increased complexity and expense to the system beyond that which is acceptable in many disk systems.

In accordance with the present invention, surprisingly simple and economical implementations have been discovered for handling the resonance problem which can be readily incorporated into an existing system with relatively little expense.

In the particular disk memory system described herein, the problem to be solved arises because head seek operations can cause the baseplate assembly on which the disks are mounted to build up oscillations at its natural resonance frequency. Unfortunately, this natural resonance frequency typically occurs at a frequency for which the gain of the servo positioning control circuitry is relatively low. As a result, the serve positioning control circuitry cannot adequately handle the baseplate resonance condition, thereby resulting in unreliable and/or inaccurate head positioning. As pointed out above, increasing the bandwidth of the servo positioning control circuitry or changing the mechanical structure, or any of the other prior art approaches summarized above may not be desirable solutions to this resonance problem because of the increased cost and complexity which they entail. In addition, the degree of baseplate resonance amplitude may vary from mass-produced unit to unit as a function of the piece part tolerances including assembly fastener tightness tolerances.

In accordance with the present invention, unexpectedly simple solutions to the baseplate resonance problem have been discovered which merely require that the timing of head seek operations be controlled in a manner such that the baseplate resonance oscillations cannot build up in amplitude. These solutions were arrived at by determining that it is possible during normal seek operations for the timing of seek operations to occur at times such that the reaction forces produced by the head actuator on the baseplate will reinforce baseplate oscillatory motion and thereby produce the undesired resonance condition. In the preferred embodiments described herein, the occurrence of this resonance condition is avoided by appropriately controlling the time of performance of seek operations such that reinforcement of baseplate motion does not occur.

The specific nature of the invention as well as other objects, features, advantages and uses thereof will become apparent from the following detailed description taken in conjunction with the accompanying drawings.

DETAILED DESCRIPTION

Like numerals and characters refer to like elements throughout the figures of the drawings.

Figure 1:
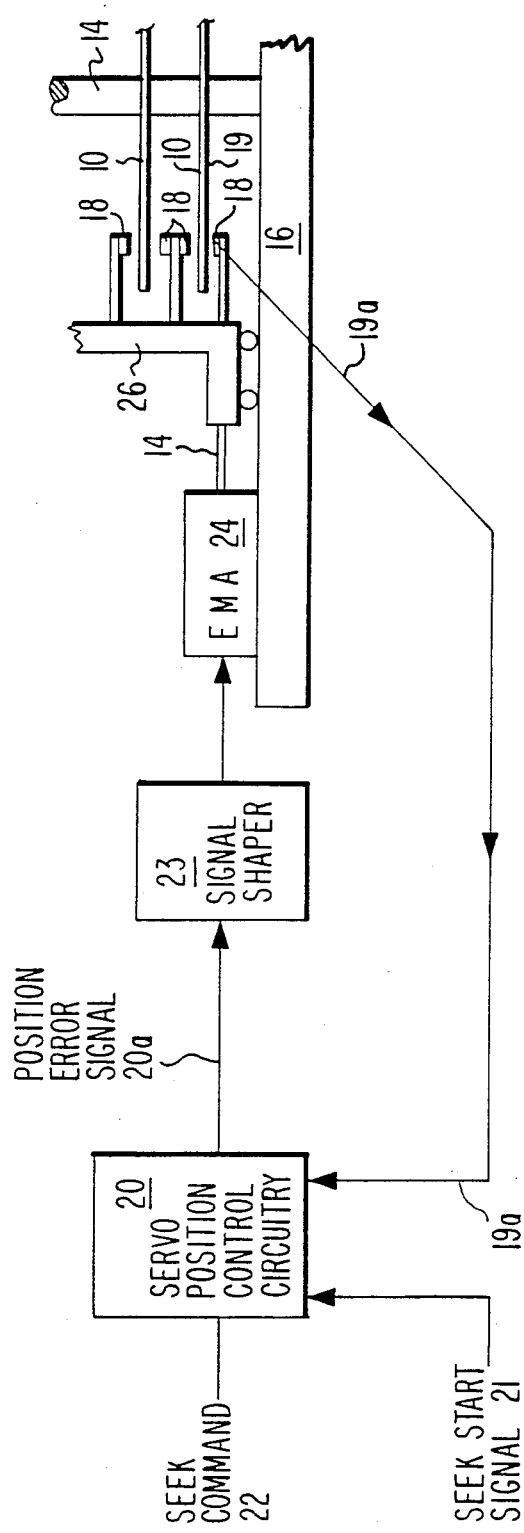
FIG. 1 is a block diagram illustrating the head positioning portion of a prior art disk recording and reproducing system.

Referring initially to FIG. 1, illustrated therein is a block diagram illustrating the head positioning portion of a conventional type of disk recording and reproducing system. As shown, a stack of spaced concentric magnetic disks 10 are mounted to a spinner-motor-driven shaft 14 which in turn is mounted to a baseplate assembly 16. Also attached to the baseplate 16 is the permanent magnet assembly of an electromagnetic head actuator 24, which may typically include a voice coil motor. Radially movable read/write magnetic heads 18 are associated with respective surfaces of the disks 10.

Typically, one surface of the disks 10 serves as a servo surface 19. The servo data recorded on this servo surface 19 is read by its respective head 18 for providing servo feedback signals 19a to conventional servo positioning control circuitry 20 which are indicative of the radial position of the heads 18 relative to concentric data tracks provided on the disks 10. When a seek start signal 21 is provided, the servo positioning control circuitry 20 responds to the servo feedback signals 19a and also to a seek command signal 22 indicative of a desired track to which the heads 18 are to be moved (seek operation) to produce a position error signal 20a. This position error signal 20a is applied via a signal shaper 23 (typically consisting of a curve or velocity scheduler and a power amplifier) to the electromagnetic head actuator 24 which radially drives a carriage 26 on which the heads 18 are supported. The servo positioning circuitry 20 responds to the servo feedback signals 19a and the command seek signal 22 to provide a position error signal 20a to the signal shaper 23 which in turn provides an appropriately shaped signal to the head actuator 24 for radially moving the heads 18 to the commanded track on the disks 10. Further information with regard to the manner in which servo positioning circuitry such as 20 is conventionally provided may be obtained, for example, from the article "Design of a Disk File Head-Positioning Servo" by R. K. Oswald, IBM J. Res. Develop., Nov. 1974, pages 506–512.

It is to be understood with respect to FIG. 1 that the problem which the present invention is directed to solving is the previously explained undesirable resonance condition of the baseplate assembly 16 occurring when seek operations occur at times such that the reaction forces of the head actuator 24 acting on the baseplate assembly 16 are reinforced.

Figure 2:
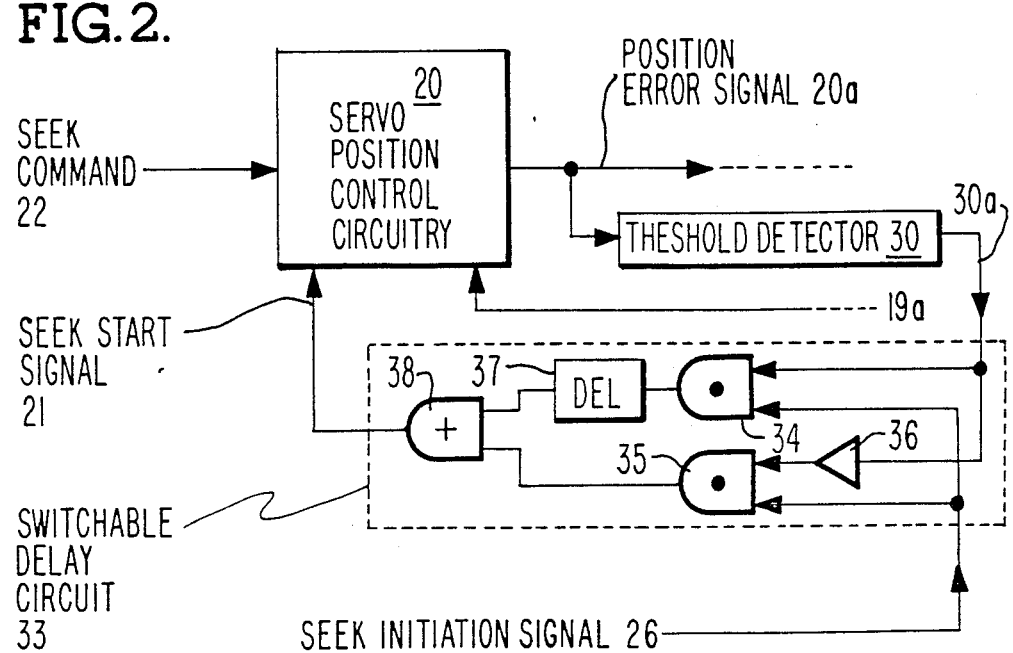
FIG. 2 is a block and circuit diagram illustrating a first embodiment of the invention.

A first approach for solving the baseplate resonance problem in accordance with the invention is illustrated in FIG. 2. As shown in FIG. 2, a threshold detector 30 is provided for monitoring the amplitude of the position error signal 20a. The threshold detector 30 is constructed and arranged to produce a true or "1" output 30a when the amplitude of the position error signal 20a increases to a value which is indicative of a baseplate resonance condition. This is typically manifested by a "ringing" or oscillation of the position error signal 20a which will then have a significantly greater than normal amplitude observed when a single seek occurs after a long period of non-seeking. When the amplitude of the position error signal 20a has a normal amplitude, indicating that the baseplate resonance condition is not occurring, the output of the threshold detector is false or "0".

As shown, the circuit of FIG. 2 also includes a switchable delay circuit 33 whose output provides the seek start signal 21 which is applied to the servo position control circuitry 20 to initiate the seek operation. The delay circuit 33 operates in response to a true seek initiation signal 26 to provide a seek start signal 21 to the servo position control circuitry 20 without delay when the threshold circuit output 30a is false; on the other hand, when the threshold circuit output 30a is "true", a predetermined delay is introduced, thereby delaying the time of occurrence of the next seek operation. The threshold amplitude of the threshold circuit 30 is chosen in conjunction with the delay provided by the switchable delay circuit 32 so that the ringing (resonance condition) will be forced to die down to an acceptable level before the next seek operation is initiated. The delay required is at least greater than one-half cycle at the baseplate resonance frequency.

As shown in FIG. 2, the switchable delay 33 may typically comprise AND gates 34 and 35, an inverter 36, a fixed delay 37 and an OR gate 38 interconnected as shown. The seek initiation signal 26 is applied to the inputs of both of AND gates 34 and 35. The threshold circuit output 30a is applied directly to the other input of AND gate 34 and via an inverter 36 to the other input of AND gate 35. The output of AND gate 35 is applied to the servo position control circuitry 20 via OR gate 38, while the output of AND gate 34 is first applied to the fixed delay circuit 37. Delay circuit 37 may typically be implemented using a one-shot.

It will be understood that the operation of the switchable delay circuit 33 in FIG. 2 is such that, when the threshold circuit output 30a is true (indicating a resonance condition), the resulting true state thereof enables AND gate 34 so that the seek initiation signal 26 passes to the servo position control circuitry 20 via the delay circuit 37 and OR gate 38, thereby delaying the next seek operation by an amount sufficient to prevent reinforcement of the resonance condition. On the other hand, when the threshold circuit output 30a is false (indicating that no resonance condition is present), the seek initiation signal 23b passes through AND gate 35 and OR gate 38 to the servo position control circuitry 20 without delay.

Figure 3:
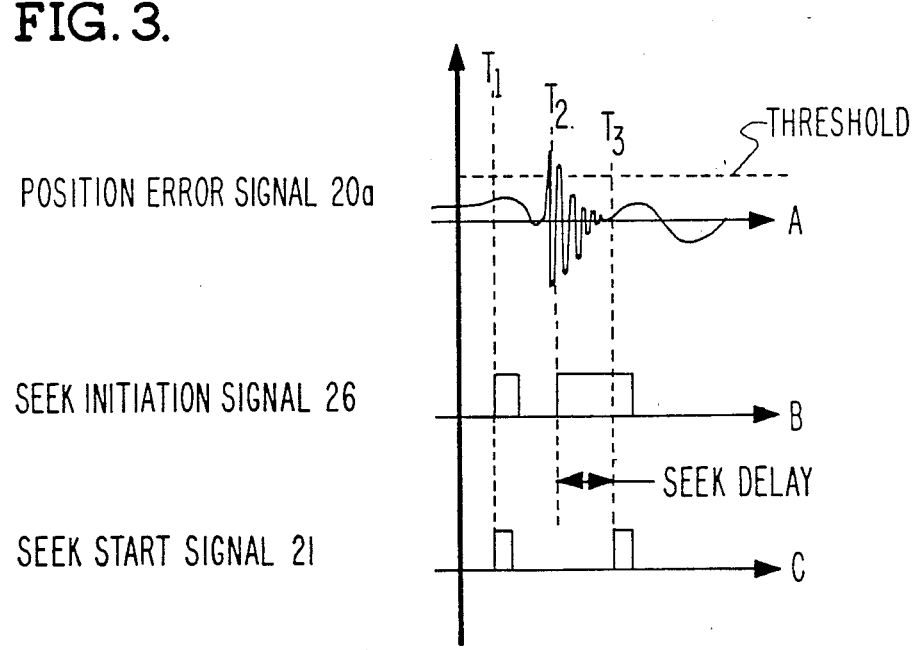
FIG. 3 is a series of graphs illustrating the operation of the embodiment of FIG. 2.

The timing graph of FIG. 3 illustrates typical operation of the circuit of FIG. 2. Graph A in FIG. 3 illustrates a typical position error signal 20a appearing at the output of the servo position control circuitry in FIG. 2, Graph B illustrates typical seek initiation signals 26, and Graph C illustrates the resulting start seek signals 21 obtained in response thereto. At time T1, the position error signal 20a in Graph A is normal and below the threshold value of the threshold circuit 30 in FIG. 2. Thus, a true seek initiation signal 23b occurring at time T1 in Graph B causes an undelayed start seek signal 21 to be applied to the position control circuitry 20, as shown in Graph C.

At time T2, on the other hand, it will be seen in Graph A that the position error signal 20a is "ringing", indicating that the baseplate assembly is resonating. As a result, the amplitude of the position error signal 20a will exceed the threshold of the threshold circuit 30. Thus, if a true seek initiation signal 26 is provided at T2, as shown in Graph B, it will be delayed by the switchable delay circuit 33 in FIG. 2 so that, as shown in Graph C in FIG. 3, the corresponding start seek signal 21 will not be produced until time T3 when the ringing of the position error signal 20a will have died down.

Figure 4:
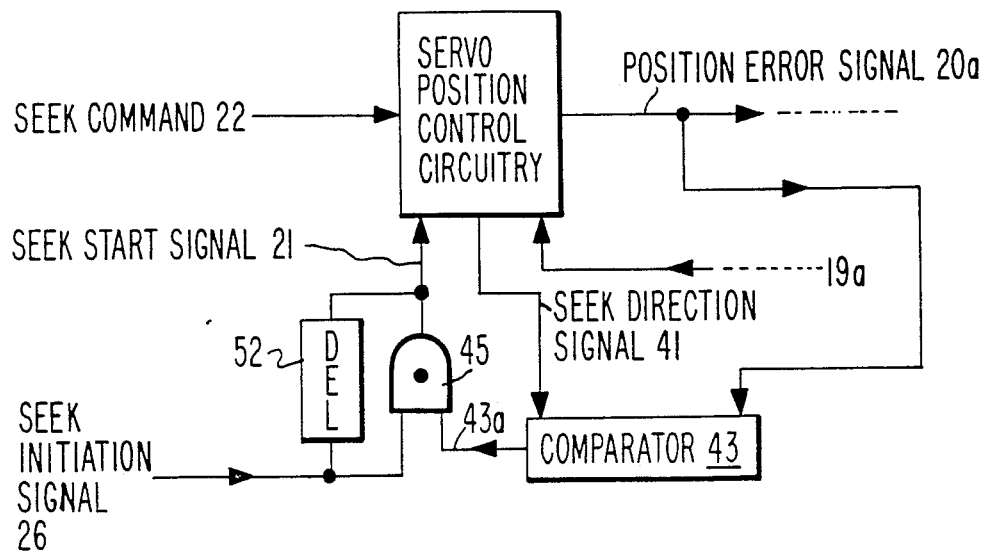
FIG. 4 is a block and circuit diagram illustrating a second embodiment of the invention.

Although the approach of FIG. 2 provides a solution to the baseplate resonance problem, it is not suitable for applications where fast access time is a primary requirement, since the average seek delay introduced by the switchable delay circuit 33 may be too large for practical use in such applications. FIG. 4 illustrates a second approach in accordance with the invention which not only provides for solving the baseplate resonance problem, but does so without significantly increasing the average access time.

Before considering the embodiment of FIG. 4 in detail, the basic approach employed by the FIG. 4 embodiment will first be considered. The basic approach is to compare the direction of motion of the baseplate assembly 16, as indicated by the polarity of the position error signal 20a, with the direction of the applied force which will be produced by the upcoming seek. If this comparison indicates that this seek will reinforce the baseplate motion, then the seek is delayed until the polarity of the position error signal 20a is in the opposite direction so that the reaction force produced at the start of the seek will be in a direction which will counteract the motion of the baseplate assembly 16. Although the motion of the baseplate assembly 16 may not be completely cancelled, a significant reduction in its motion will occur. As a result, any baseplate ringing that occurs will remain small and will not significantly affect positioning accuracy.

The average access delay introduced by the circuit of FIG. 3 will thus be relatively small since: (1) the delay occurs only when the seek direction will be such as to reinforce the baseplate motion, (2) the delay will last only until the baseplate motion changes its direction, and (3) this change in direction of the baseplate assembly will be expedited by the counteracting force produced by the delayed seek operation.

The circuit of FIG. 4 will now be more specifically considered. It will be understood that a seek direction signal 41 having a polarity indicative of the direction of an upcoming seek may readily be provided in a conventional manner by the servo position control circuitry 20 in response to the disk servo signals 19a (which are indicative of the present track) and the seek command signal 22 (which is indicative of the new track to which the heads are to be moved). As shown in FIG. 4, this seek direction signal 41 is applied to a comparator 43 along with the position error signal 20a. The comparator 43 is constructed and arranged to provide a true or "1" output signal 43a only when the polarities of the applied signals 20a and 41 are opposite, which represents the condition where the directions of the baseplate motion and the force of the upcoming seek are such that the two will counteract one another. On the other hand, when the polarities of the input signals 20a and 41 are the same, indicating that reinforcement of baseplate motion will occur, the comparator 43 will provide a false or "0" output signal 43a.

As shown in FIG. 4, the comparator output signal 43a is applied to an AND gate 45 along with the seek initiation signal 26. It will thus be understood that when the seek initiation signal 26 is true or "1", the AND gate 45 will provide a true seek start signal 21 to the servo position control circuitry 20 to initiate a seek operation only when the directions of the baseplate motion and the force of the upcoming seek are such as to counteract one another. In order to guarantee that there will not be an excessive delay before the start of a seek in the event that there is no baseplate vibration, a delay circuit 52 is preferably included bypassing AND gate 45 so that the seek delay will be limited to a predetermined maximum amount, which is at least greater than one-half cycle at the structural resonance frequency. For example (as will later be illustrated with reference to FIG. 5c), the provision of this bypassing delay circuit 52 permits handling the situation where no baseplate vibration is present and some external disturbance is preventing the polarity of the position error signal 20a from becoming opposite to the seek direction signal 41.

Figure 5A:
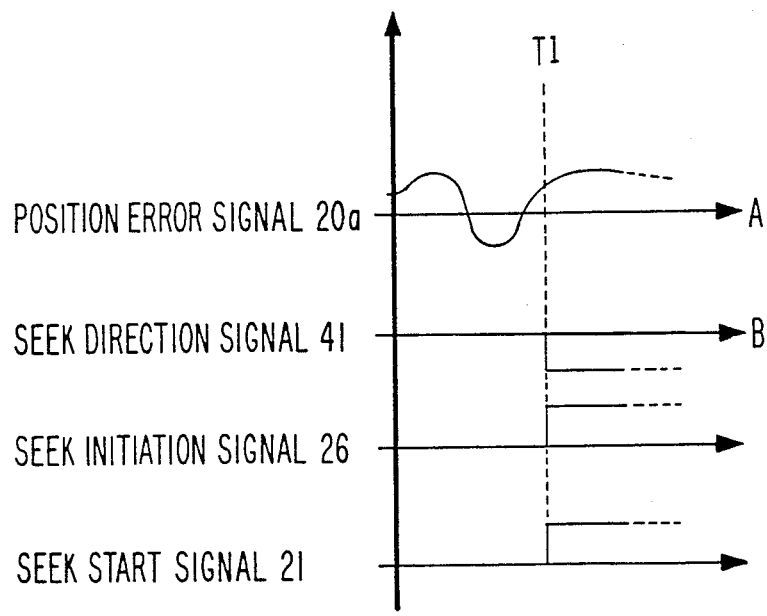
FIGS. 5a, 5b and 5c are graphs illustrating the operation of the embodiment of FIG. 4.
Figure 5B:
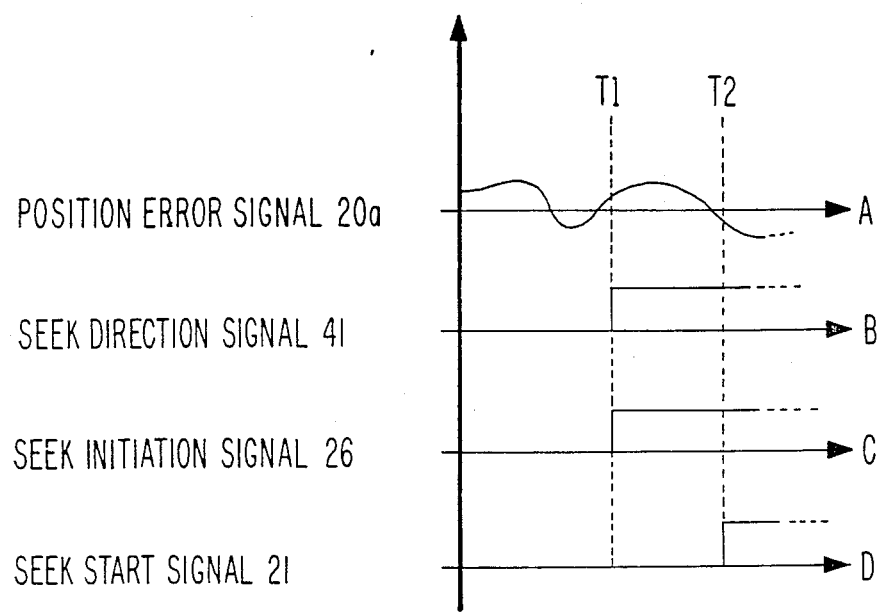
Figure 5C:
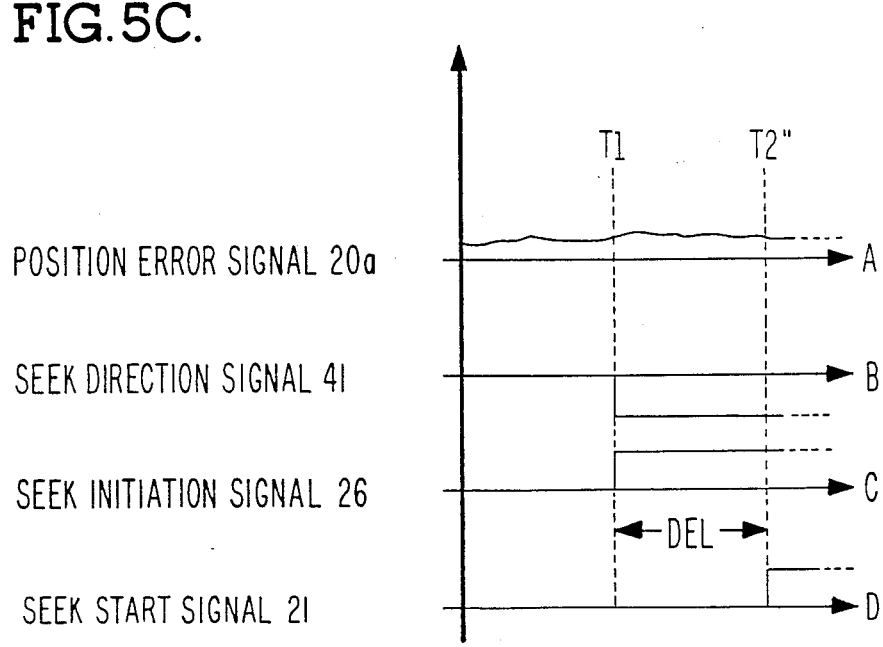

FIGS. 5a, 5b and 5c illustrate typical operation of the circuit of FIG. 4 for three possible situations. In each of these figures, Graph A illustrates a typical position error signal 20a, Graph B illustrates a typical seek direction signal 41, Graph C illustrates a typical seek initiation signal 26, and Graph D illustrates the resulting seek start signal 21 obtained in response thereto. It will be seen from Graphs A and B in FIG. 5a that at time T1 the position error signal 20a and the seek direction signal 41 have opposite polarities, thereby causing the comparator 43 in FIG. 4 to enable AND gate 45. Thus, the true state of the seek initiation signal 26 (Graph C) at time T1 will produce an undelayed seek start signal 21 (except for normal circuit delays) at the output of AND gate 45, as shown in Graph D.

In FIG. 5b, on the other hand, the polarities of the position error signal 20a (Graph A) and the seek direction signal 41 (Graph B) at time T1 are the same. Thus, even though the seek initiation signal 26 (Graph C) is true, AND gate 45 will not be enabled by the comparator 43 until time T2' when these signals 20a and 41 have different polarities. As a result, the seek start signal 21 will not be produced to initiate the next seek operation until time T2, as shown in Graph D.

FIG. 5c illustrates the situation where no baseplate vibration is present and the position error signal 20a (Graph A) remains negative for an indefinite period as a result of the presence of an external disturbance. At time T1 in FIG. 5c, the upcoming seek operation is in a direction such that the seek direction signal 41 (Graph B) also becomes negative. If the delay circuit 52 in FIG. 4 were not present, the start of the next seek could be unduly delayed. The delay circuit 52 in FIG. 4 prevents the next seek from being indefinitely delayed by permitting the seek initiation signal 26 to pass through the delay circuit 52 (thereby bypassing AND gate 45) so as to produce a seek start signal 21 at time T2', as shown in Graph D. The delay produced by the delay circuit 52 is indicated by DEL in Graph D.

It is to be understood that the present invention is not limited to the embodiments disclosed herein, since many modifications and variations in construction, arrangement, operation and use are possible without departing from the scope of the invention. Accordingly, the present invention is to be considered as including all possible modifications and variations encompassed within the scope of the appended claims.

What is claimed is:

1. In a transducer positioning system, the combination comprising:

a storage means;

at least one movable transducer cooperating with said storage means;

positioning means for positioning said transducer relative to said storage means;

supporting means for said above mentioned means constructed and arranged in conjunction therewith so that the positioning of said transducer by said positioning means can cause positioning reaction forces to act on said supporting means in a manner which produces excessive oscillation build-up therein; and control means for controlling the timing of the position changes to be performed by said positioning means in a manner such as to inhibit said oscillation build-up;

said control means including detecting means for determining when an upcoming position change to be performed by said positioning means will produce a reaction force which will act to reinforce oscillation build-up therein and position change start means responsive to said detecting means determining that said reaction force is in a direction which will act to reinforce oscillation build-up for preventing the start of a position change until said reaction force is in a direction which will act to reduce oscillation build-up.

2. The invention in accordance with claim 1, wherein said start means also includes means for starting a position change after a predetermined time if not already started by said position change start means.

3. The invention in accordance with claim 2, wherein said predetermined time is at least greater than one-half cycle of the resonant frequency of said supporting means.

4. The invention in accordance with claim 1, wherein said positioning means includes positioning control circuitry which produces a position error signal indicative of the direction of said oscillation build-up and a position change signal indicative of the direction of said reaction force, wherein said detecting means includes comparing means for comparing the relative directions indicated by said position error signal and said position change signal, and wherein said position change start means is responsive to said comparing means for preventing the start of a position change until the directions indicated by said position error signal and said position change signal correspond to a condition such that said reaction force will act to reduce oscillation build-up.

5. The invention in accordance with claim 4, wherein said start means also includes means for starting a position change after a predetermined time if not already started by said position change start means.

6. The invention in accordance with claim 5, wherein said predetermined time is at least greater than one-half cycle of the resonant frequency of said supporting means.

7. The invention in accordance with claim 1, 2, 3, 4, 5 or 6, wherein said storage means comprises at least one rotatable disk capable of storing data thereon, wherein said positioning means includes actuator means coupled to said transducer for positioning said transducer at different radial positions of said disk, and wherein said supporting means includes a baseplate for supporting said disk and said actuator.

* * * * *